(12) United States Patent
Mengibar et al.

(10) Patent No.: US 9,159,315 B1
(45) Date of Patent: Oct. 13, 2015

(54) ENVIRONMENTALLY AWARE SPEECH RECOGNITION

(71) Applicants: Pedro J. Moreno Mengibar, Jersey City, NJ (US); Eugene Weinstein, New York, NY (US)

(72) Inventors: Pedro J. Moreno Mengibar, Jersey City, NJ (US); Eugene Weinstein, New York, NY (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 13/735,592

(22) Filed: Jan. 7, 2013

(51) Int. Cl.
*G10L 15/00* (2013.01)
(52) U.S. Cl.
CPC ..................................... *G10L 15/005* (2013.10)
(58) Field of Classification Search
USPC .......................... 704/246, 247, 251, 252, 255
See application file for complete search history.

(56) References Cited

U.S. PATENT DOCUMENTS

| | | | |
|---|---|---|---|
| 2003/0125955 A1* | 7/2003 | Arnold et al. | 704/270.1 |
| 2008/0147411 A1* | 6/2008 | Dames et al. | 704/275 |
| 2011/0231182 A1* | 9/2011 | Weider et al. | 704/9 |
| 2012/0041764 A1* | 2/2012 | Xu et al. | 704/256.1 |
| 2012/0150541 A1* | 6/2012 | Talwar et al. | 704/249 |

OTHER PUBLICATIONS

Young, "HMMS and Related Speech Recognition Technologies", Springer Handbook on Speech Processing and Speech Communication, (2008) pp. 1-26.

* cited by examiner

*Primary Examiner* — Leonard Saint Cyr
(74) *Attorney, Agent, or Firm* — McDonnell Boehnen Hulbert & Berghoff LLP

(57) ABSTRACT

Examples of methods and systems for implementing environmentally aware speech recognition are described. In some examples, a method may be performed by a computing device within a system to adapt an acoustic model for a particular language to one or more environmental conditions. A device may receive one or more spoken utterances and based on the utterances, a system containing the device may determine an acoustic model for the particular language. The system may adapt the acoustic model using one or more data sets depending on the environmental conditions at the location of the device or may obtain another acoustic model that is adapted to the environmental conditions. In some examples, the system may also adapt the acoustic model using one or more data sets based on the voice characteristics of the speaker of the one or more spoken utterances.

20 Claims, 5 Drawing Sheets

ENVIRONMENTALLY AWARE SPEECH RECOGNITION

BACKGROUND

Computing devices include various combinations of hardware and software which enable the user to, among other things, interact with a computing system. One example of a modern user-interface is "voice control" that may allow a user to provide speech data to a speech recognition module of a computing system. The data may be received, translated into text, and processed by the speech recognition module, and may ultimately be used by the computing system as a basis for executing certain computing functions. Speech recognition modules continue to be more useful for users who need free use of their hands and control of a computing device simultaneously. For example, a doctor performing surgery may take advantage of a speech recognition module in order to execute commands on a computing device while operating on a patient with his or her hands. In addition, various speakers may command the same computing device at different times through the use of speech commands. Likewise, a device receiving speech commands may receive the commands in various environments depending on the location of the device.

SUMMARY

In one aspect, a method is described. The method may comprise receiving, via a device, one or more spoken utterances and based on the one or more spoken utterances, identifying a language of the one or more spoken utterances. The method may also comprise determining an acoustic model for a particular language based on the identified language, and the acoustic model for the particular language is configured for use in speech recognition. The method may further comprise determining a location of the device and determining one or more environmental conditions regarding an environment of the location of the device. The method may also comprise determining from among a plurality of data sets at least one adaptation data set based on the one or more environmental conditions, and using the at least one adaptation data set, adapting the acoustic model for the particular language to obtain another acoustic model that is adapted to the one or more environmental conditions.

In another aspect, a computer readable medium having stored thereon instructions that, when executed by a computing system, cause the computing device to perform functions is described. The functions may comprise receiving, via a device, one or more spoken utterances and based on the one or more spoken utterances, identifying a language of the one or more spoken utterances. The functions may also comprise determining an acoustic model for a particular language based on the identified language, and the acoustic model for the particular language is configured for use in speech recognition. The functions may further comprise determining a location of the device and determining one or more environmental conditions regarding an environment of the location of the device. The functions may also comprise determining from among a plurality of data sets at least one adaptation data set based on the one or more environmental conditions, and using the at least one adaptation data set, adapting the acoustic model for the particular language to obtain another acoustic model that is adapted to the one or more environmental conditions.

In still another aspect, a system is described. The system may comprise at least one processor and data storage comprising program instructions executable by the at least one processor to cause the system to perform functions comprising receiving, via a device, one or more spoken utterances and based on the one or more spoken utterances, identifying a language of the one or more spoken utterances. The functions performed by the system may also comprise determining an acoustic model for a particular language based on the identified language, and the acoustic model for the particular language is configured for use in speech recognition. The functions may further comprise determining a location of the device and determining one or more environmental conditions regarding an environment of the location of the device. The functions may also comprise determining from among a plurality of data sets at least one adaptation data set based on the one or more environmental conditions, and using the at least one adaptation data set, adapting the acoustic model for the particular language to obtain another acoustic model that is adapted to the one or more environmental conditions.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
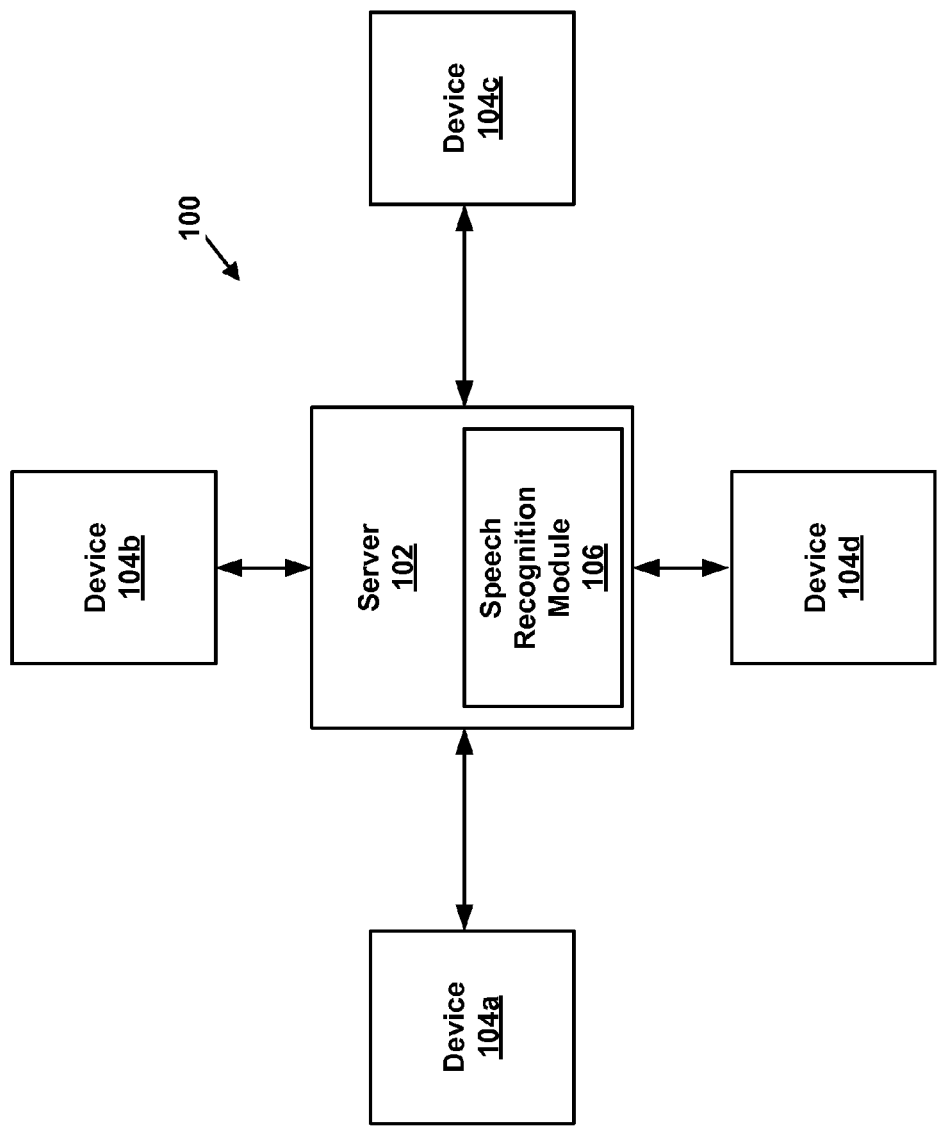
FIG. 1 illustrates an example communication system in which an example method may be implemented.

The following detailed description describes various features and functions of the disclosed systems and methods with reference to the accompanying figures. In the figures, similar symbols identify similar components, unless context dictates otherwise. The illustrative system and method examples described herein are not meant to be limiting. It may be readily understood that certain aspects of the disclosed systems and methods can be arranged and combined in a wide variety of different configurations, all of which are contemplated herein.

The following detailed description may disclose methods and systems for implementing environmentally aware speech recognition. In one aspect, a system with one or more entities may be configured to perform the methods described herein. The system may be configured to receive one or more spoken utterances from a device (e.g., a mobile device). The device may communicate with the entities within the system and may be configured to receive a verbal input from one or more speakers using the device. The system may be configured to identify a language based on the one or more spoken utterances and to determine an acoustic model for the particular language from a plurality of acoustic models. In addition, the system may be configured to determine the location of the device and environmental conditions of the device. Based on the environmental conditions, the system may determine at least one adaptation data set from among a plurality of data sets to adapt the acoustic model for the particular language to the environmental conditions. Further, the system may use one or more adaptation sets to obtain another acoustic model from within the system or another entity (e.g., server) that is adapted to the environmental conditions. The system may obtain other acoustic models that vary depending on the environmental conditions and may be stored within memory or received from another entity. Similarly, the various data sets may be stored at a server with each relating to an environmental condition or other element that may impact reception and recognition of spoken utterances from a speaker by a device.

In another example, the system may be configured to determine voice characteristics of a speaker of the spoken utterances and to determine at least one speaker data set based on the voice characteristics from among the plurality of data sets. The system may be configured to use the speaker data sets to further adapt the acoustic model for the particular language to the speaker or to obtain another acoustic model based on the particular language. Similarly, the system may be configured to determine a type of wireless connection in use by the device and to determine from among the plurality of data sets at least one device data set based on the type of wireless connection. The system may use the device data sets to further adapt the acoustic model for the particular language or to obtain another acoustic model that may be adapted to the particular conditions.

Additionally, the system may be configured to determine weather conditions of the location of the device and to determine at least one weather data set from among the plurality of data sets. The system may use the weather data sets to further adapt the acoustic model for the particular language or for selecting another acoustic model adapted to the particular weather conditions. Similarly, based on the spoken utterances, the system may determine one or more voice characteristics, which may be used to determine speaker data sets from the plurality of data sets to further adapt the acoustic model or to obtain another acoustic model. Other data sets to further adapt or select one or more acoustic models may exist as well.

In some instances, the system may adapt or select the acoustic model for the particular language using one or more acoustic model adaptation techniques, such as maximum likelihood linear regression (MLLR), vocal tract length normalization (VTLN), or maximum a posteriori (MAP) adaptation. Furthermore, the system may determine a rate of movement of the device and adapt the acoustic model for the particular language based on the rate of movement.

Systems, methods, and devices in which examples may be implemented will now be described in greater detail. In general, described methods may be implemented by various types of computing devices or components of the devices. In one example, a system may include one or more servers, which may receive information from and provide information to a device, such as a mobile phone. However, the described methods may also be implemented by other computing devices, such as a personal computer, a wearable computing device, or a mobile device, among others. Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

FIG. 1 illustrates an example communication system 100 in which environmentally aware speech recognition may be implemented. In the example illustrated by FIG. 1, a server 102 may communicate with one or more devices 104a-104d via a wireless and/or wired interface. In addition, the server 102 and/or each device 104a-104d may comprise a speech recognition module 106.

In some examples, the server 102 may be one or more entities configured to perform the method and computing device functions described herein. Similarly, the server 102 may perform additional methods and executions. The example illustrated in FIG. 1 shows the sever 102 communicating with multiple devices 104a-104d simultaneously. In other examples, the server 102 may be configured as a cloud interface and/or may communicate with other servers or serve as a link between other devices.

Additionally, the example communication system 100 illustrated by FIG. 1 comprises devices 104a-104d. Each device 104a-104d may be any type of computing device or transmitter, such as a laptop computer, a mobile telephone, wearable computing device, or tablet computing device, etc. In some instances, a device, such as device 104a, may be composed of one or more entities configured to perform the methods and functions described herein. The device 104a may include a user interface, a communication interface, a processor, and data storage comprising instructions executable by the processor for carrying out one or more functions relating to the data sent to, or received by, server 102. In some instances, the user interface may include buttons, a touchscreen, a microphone, and/or any other elements for receiving inputs, as well as one or more speakers, one or more displays, and/or any other elements for communicating outputs. In some examples, the server 102 and devices 104a-104d may communicate through various means, such as sharing one or more networks.

To illustrate, one or more devices 104a-104d may receive some form of input from a user, such as spoken utterances, and relay the input to the server 102. The device 104a may send the input via a wireless and/or wired link and may repeat this process until receiving a response from the server 102. By extension, the server 102 may send information to the device 104a via a wireless and/or wired link and may wait for a response from the device 104a.

Furthermore, the server 102 may use the speech recognition module 106 to transcribe the verbal input into a device-readable format and relay that format back to one or more of the devices 104a-104d. The speech recognition module 106 may be composed of one or more entities that may receive incoming spoken utterances and transcribe the spoken utterances into a device-readable format. The speech recognition module 106 may receive various types of inputs to covert the inputs into a usable format for a device, such as devices 104a-104d. Similarly, one or more devices 104a-104d may contain a speech recognition module or a similar component that may be capable of being updated by the speech recognition module 106. Other examples may exist as well.

Additionally, the speech recognition module 106 may include one or more applications which may use one or more algorithms. The speech recognition module 106 may be configured to include voice user interfaces such as search, call routing, voice dialing, simple data entry, document preparation, or speech-to-text processing, for example. In addition, the speech recognition module 106 may be configured to recognize different inputs of data. Further, the speech recognition module 106 may be configured to recognize different inputs of data. In one instance, the speech recognition module 106 may use one or more analog-to-digital converters to digitalize any data received. The speech recognition module 106 may be a separate entity from the server 102, or may be coupled to the server 102. The speech recognition module 106 may be configured to remove unwanted noise and apply filters to received digital sounds, such as recordings of spoken queries. In another example, the speech recognition module 106 may be configured to operate using the Hidden Markov Model (HMM) or neural network recognition, or a hybrid of these types. Other examples are possible.

In some examples, the server 102 may be configured to convert received data logs to text and parse the text to identify one or more functions to perform. Additionally, a device, such as device 104a, may be configured to convert the audio to text locally and then send the text information to the server 102 to be parsed. In yet another example, one or more devices 104a-104d may be configured to parse the text locally, determine one or more functions to perform, execute the one or more functions, and send information indicative of the parsing, determining, and executing to the server 102. The device may also send to the server 102 a response determination indicative of an acknowledgement (e.g., a user acknowledgement) in response to the one or more determined functions. In still another example, the device 104a may receive a textual input from a user of the device 104a rather than a verbal input. The device 104a may then parse the text input and send information to the server 102. Other examples are also possible.

Figure 2:
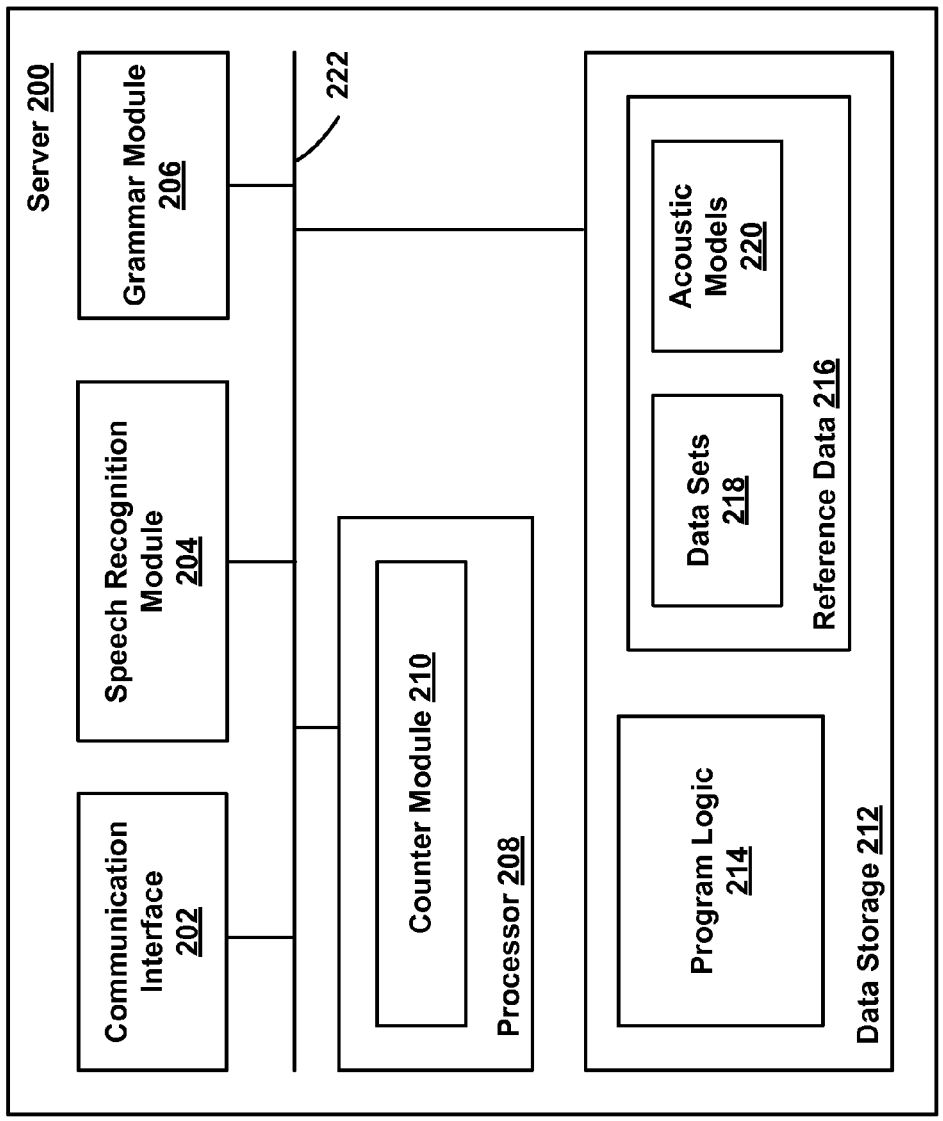
FIG. 2 illustrates a schematic drawing of an example server.

FIG. 2 illustrates a schematic drawing of a server 200 that may be used in system 100. The schematic drawing of server 200 may comprise one or more components, such as a communication interface 202, a speech recognition module 204, grammar module 206 and processor 208. In addition, the server 200 may contain a processor 208 configured to comprise a counter module 210. Similarly, the example shows server 200 comprises data storage 212, which contains program logic 214, and reference data 216. Reference data may contain one or more data sets 218 and acoustic model(s) 220. All the components within server 200 may be linked by a communication link 222.

The server 200 may communicate with one or more devices in a system, such as the system shown in FIG. 1. The server 200 may be configured to execute one or more tasks with other servers or devices. The components within server 200 may exist outside of server 200 and/or may be combined into fewer components or split into more components. In addition, the server 200 may further comprise additional components not discussed herein.

The communication interface 202 within the server 200 may be configured to allow communication the server 200 to communicate with external devices or internal communication between components. Likewise, the communication interface 202 may be configured to allow one or more users to communicate with the server 200.

Along with the communication interface 202, the server 200 may comprise a speech recognition module 204, which may be internal or external to the server 200. The server 200 may be configured to communicate with the speech recognition module 204 through the communication interface 202. The speech recognition module 204 may be configured to receive input, such as spoken utterances, and determine transcriptions for the received spoken utterances in response. The transcriptions may be in a device-readable form so that server 200 or another computing device may receive the transcriptions from the speech recognition module 204 and have the ability to read or execute the transcriptions properly.

Further, the speech recognition module 204 may be configured to determine unwanted transcriptions through the use of a speech recognizer, probabilities and statistics, comparisons with prior transcriptions and/or a stored vocabulary dictionary. In some examples, the speech recognition module 204 may be configured to operate differently than the speech recognition modules inside devices of users. For example, the speech recognition module 204 may be configured to use more time and apply additional comparison algorithms to further remove unwanted transcriptions to improve accuracy by the speech recognizer. In some example methods, the speech recognition module 204 may be configured to operate as a text recognition module. Similarly, the speech recognition module 204 may be configured to receive different types of input, such as spoken utterances or textual input, from various devices.

In some examples, the speech recognition module 204 may be a speaker-dependent module or a speaker-independent module, or a combination of the two types. As discussed above, the speech recognition module 204 may be configured to operate as a Hidden Markov Model (HMM), dynamic time warping (DTW) based speech recognition module, a neural network, or a hybrid of these systems.

Additionally, the speech recognition module 204 may be configured to use one or more algorithms to process inputs, such as identifying one or more grammar-based textual patterns, which may include one or more grammars. The speech recognition module 204 may be configured to use grammars according to the speech recognition grammar specification (SRGS) and may communicate with the grammar module 206 to execute accordingly. Further, grammars may be produced and/or stored by a grammar module 206 as shown in FIG. 2. A grammar may include a set of word patterns which may provide the speech recognition module 204 with information for determining meanings behind input from a user. In some examples, a device may be configured to use a speech recognition module to perform some tasks on the input before sending the input to the speech recognition module 204 of server 200. Grammars may be produced and/or stored at the device as well.

In the example illustrated by FIG. 2, the server 200 may contain a processor 208. The processor 208 may be configured to execute the various functions and methods described herein. In addition, the processor 208 may execute other functions or methods. In some examples, the server 200 may contain more than one processor that may communicate with one another. The processor 208 may be configured to carry out the instructions of one or more computer programs. In some examples, the processor 208 may include a counter module 210. The counter module 210 may be configured to determine a counter value indicative of a number of occurrences of a correlation between an input received from the device and previously stored inputs. The counter module 210 may be configured to increment the counter value based on at least in part of the number of occurrences. In some examples, one or more functions of the server 200 may depend or be inhibited based on the counter value of the counter module 210 compared to a threshold.

In addition, the server 200 may comprise data storage 212, which may include volatile or non-volatile types of memory and may be configured with different types of mutability. In some implementations, the data storage 212 may store program logic 214 executable by the processor 208. The data storage 212 may also store reference data 216. Other components may be stored in data storage 212 as well. Within the data storage 212, the program logic 214 may contain one or more instructions for the process 208 to execute. Similarly, the program logic 214 may be capable of being changed.

Further, the server 200 may be configured to use reference data 216 based on communication with other servers or devices. In addition, the reference data 216 may be used by one or more components of the server 200, such as the speech recognition module 204. The reference data 216 may comprise one or more data sets 218. The one or more data sets 218 may be used to adapt an acoustic model to specific conditions. Example data sets may include device data sets, weather data sets, and speaker data sets, etc. In some instances, the data sets 218 may differ from each other for a plurality of reasons, including the location of the device, specific environmental conditions at that location, and the speaker using the device.

Similarly, the reference data 216 may comprise one or more acoustic models 220. An acoustic model may be configured to give a probability of a given time slice of input audio matching a particular phoneme. Spoken utterances may be broken down into various phonemes, which may be small segmental units of sound used to form meaningful contrasts between utterances. A speech recognition module may be configured to use an acoustic model to find the probabilities of particular phonemes depending on the received spoken utterances, and thus recognize the spoken utterances. The acoustic models 220 may have been created by the server 200 or another entity by taking prior recordings of spoken utterances and the textual transcriptions of the spoken utterances to generate statistics. In addition, each acoustic model may be configured to recognize a particular language, such as English, Korean, French, etc. In some examples, the acoustic model may recognize multiple languages.

Furthermore, the acoustic models 220 may be capable of being changed or adapted by one or more data sets. For example, a speech recognition module may use an acoustic model and a data set to further adapt that acoustic model to adapt to the conditions set forth in the data set. The acoustic models 220 may consist of other acoustic models that a system may obtain to adapt an acoustic model for a particular language to environmental conditions. Additional examples may exist as well.

The example in FIG. 2 further shows the server 200 comprising a communication link 222. The communication link 222 is illustrated as a wired connection; however, wireless connections may also be used. For example, the communication link 222 may be a wired serial bus such as a universal serial bus or a parallel bus. A wired connection may be a proprietary connection as well. Likewise, the communication link 222 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

Figure 3:
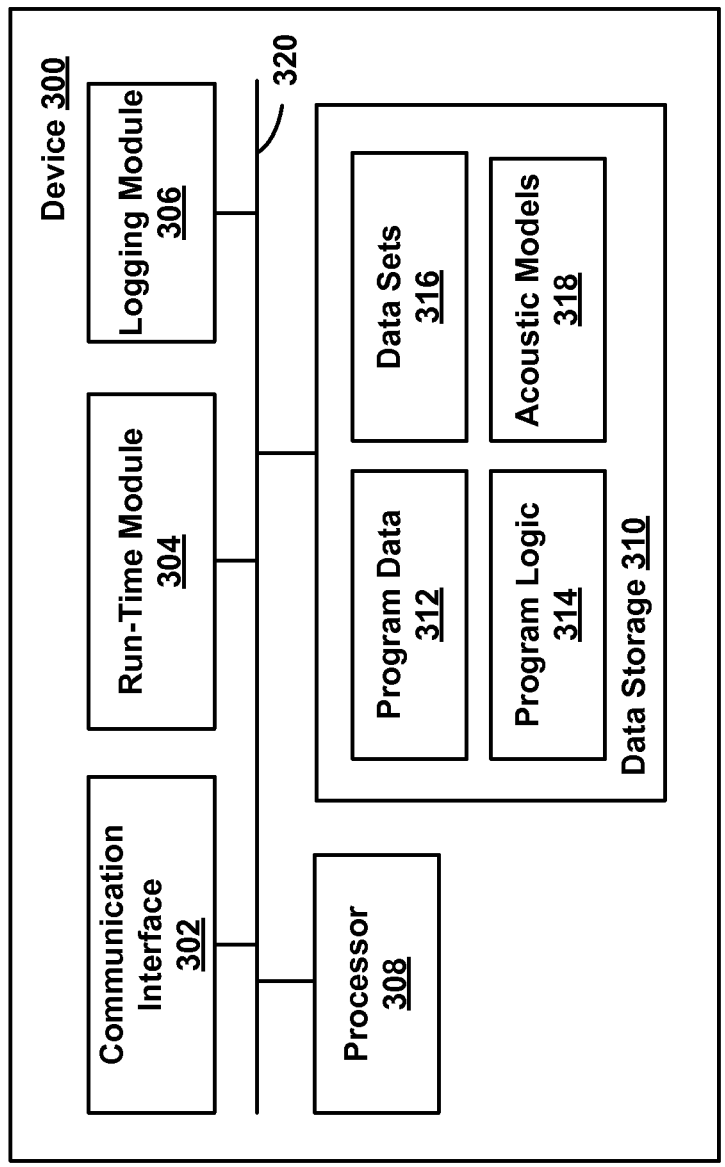
FIG. 3 illustrates a schematic drawing of an example device.

FIG. 3 illustrates a schematic drawing of example device 300. The device 300 may be any type of device capable of carrying out the functions and methods discussed herein. Some examples of devices may include a computing device, a mobile phone, a tablet computing device, and a wearable computing device, etc. In the example illustrated by FIG. 3, the device 300 comprises a plurality of components. Other example schematic drawings may exist as well. In some examples, some components of device 300 illustrated in FIG. 3 may be distributed across multiple computing devices. However, for the sake of example, the components are shown and described as part of one example device 300.

In the example illustrated by FIG. 3, the device 300 may include a communication interface 302, a speech recognition module 304, a logging module 306, a processor 308, and data storage 310. Data storage 310 may comprise program data 312, program logic 314, data sets 316, and acoustic models 318. In some examples, data storage 310 may comprise additional components using various types of memory. In addition, all or some of the components illustrated in FIG. 3 may be linked together by a communication link 320. The device 300 may also include various hardware components to enable communication within the device 300 and between the device 300 and another computing device (not shown), such as the server shown in FIG. 2. For example, the device 300 may use hardware such as transmitters, receivers, and antennas.

The device 300 may be configured with the communication interface 302, which may allow the device 300 to communicate with another computing device (not shown), such as the server 200 shown in FIG. 2. In addition, the communication interface 302 may be configured to receive input data from one or more computing devices, and may also be configured to send output data to the one or more computing devices. In some examples, the communication interface 302 may also maintain and manage records of data received/sent by the device 300. In other examples, records of data may be maintained and managed by other components of the device 300. The communication interface 302 may be configured to perform additional functions as well.

The device 300 may also be configured to include the run-time module 304, which may be configured to perform grammar-based textual pattern matching utilizing grammars which may be provided by the server. In some examples, the run-time module 304 may be configured to perform speech/text recognition functions locally at the device 300, in a similar manner as the speech recognition module 204 described in FIG. 2. In another example, the run-time module 304 may be configured to receive a textual input (also referred to as an input instruction) from a separate module configured to convert a verbal input into the textual input. It should be understood, that the functions performed by the run-time module 304 may be divided between the device 300 and one or more servers in a particular network.

In some examples, the run-time module 304 may utilize a given grammar in order to parse a textual input. By parsing the textual input, the run-time module 304 may perform argument identification along with pattern classification. Argument identification may include assigning one or more arguments to one or more portions of the given textual input. Pattern classification may include assigning a function to perform to a given textual input.

In addition, the run-time module 304 may perform grammar-based/rule-based textual pattern matching using a variety of techniques, such as by use of finite state machines, algorithms, or other techniques known by those having ordinary skill in the art. In some examples, the run-time module may be configured to perform speech recognition as well.

After parsing the textual input, the run-time module 304 may send an output comprising a record of the textual input and the result of the parsing of the textual input to the logging module 306 that is configured to store the output received from the run-time module 304. The logging module 306 may also be configured to store one or more portions of the textual input, including any portion that may not have been successfully parsed due to one or more incorrect grammars. In some examples, the logging module 306 may store data locally at the device 300. In other examples, the logging module 306 may store data remotely at another computing device. The logging module 306 may then send data to the server to be processed so as to update grammars associated with the textual input. Modifications may be made to an incorrect grammar when an unsuccessful parsing occurs due to the incorrect grammar. The logging module 306 may store and organize the data received from the run-time module 304.

The logging module 306 may also be configured to perform other tasks, including recording the spoken utterances or keeping a record of any adaptations made to the acoustic model of the device. For example, the logging module 306 may be configured to record the various types of acoustic models used and the different data sets that may have been applied to the acoustic module to further adapt the acoustic model to different conditions. The logging module 306 may be configured to perform additional tasks as well.

Similar to the communication link within FIG. 2, the communication link 320 is illustrated in FIG. 3 is shown as a wired connection; however, wireless connections may also be used. For example, the communication link 320 may be a wired serial bus such as a universal serial bus or a parallel bus. Other types of communication links may be used as well.

Figure 4:
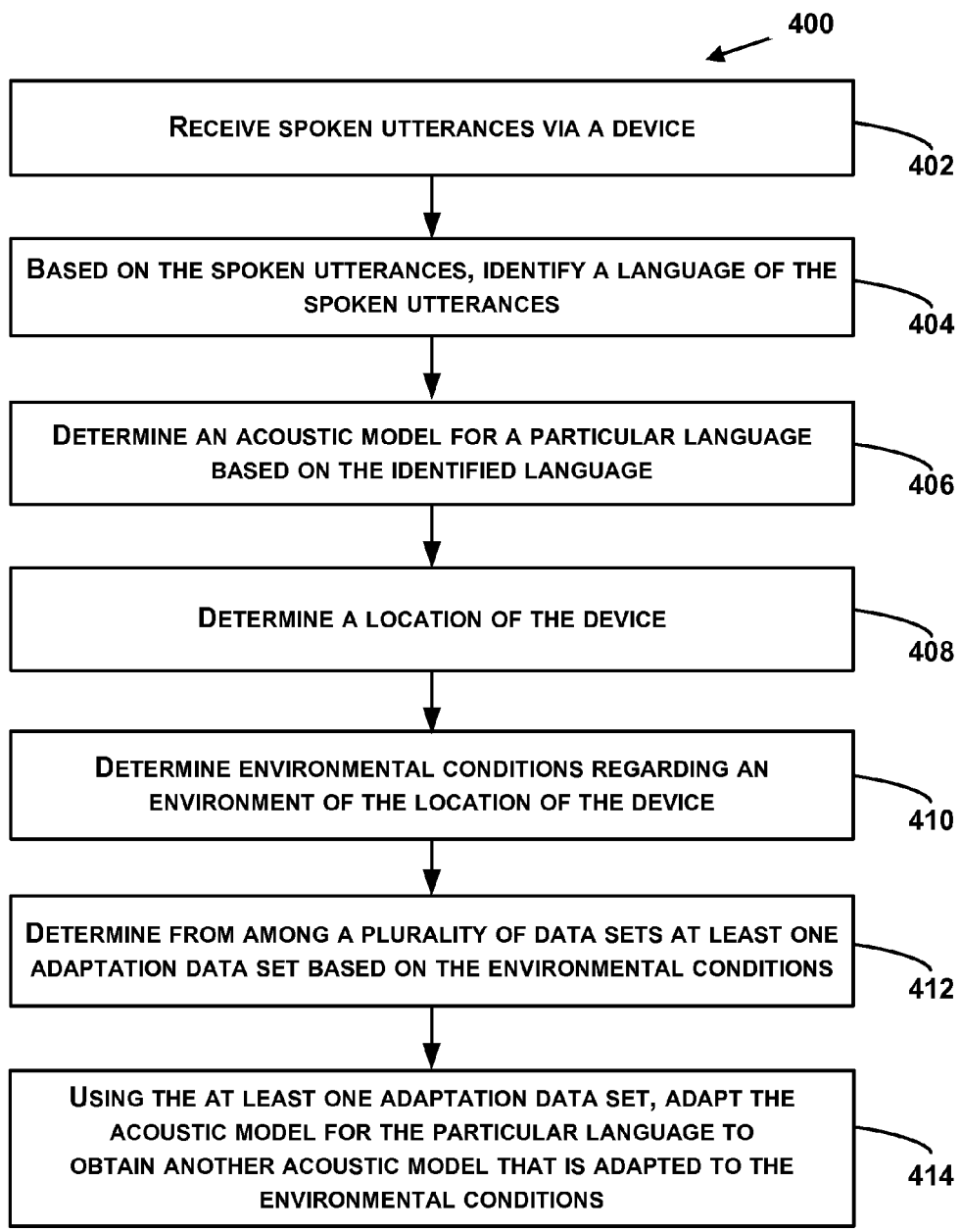
FIG. 4 depicts a flow chart of an example method for adapting a speech recognition module to environmental conditions.

FIG. 4 depicts a flow chart of an example method. Method 400 may include one or more operations, functions, or actions as illustrated by one or more of blocks 402-414. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present examples. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method 400 shown in FIG. 4 will be described as implemented by a server in communication with a device. It should be understood that other entities can implement one or more steps of the example method.

At block 402, the method 400 comprises receiving spoken utterances via a device. Some examples of devices that may receive one or more spoken utterances include mobile phones, wearable computing devices, tablet computing devices, etc. Similarly, a different entity (e.g., server) may receive the spoken utterances. In some instances, a device may receive the spoken utterances from one or more speakers, or may receive the spoken utterances from another device. The spoken utterances may be captured in real-time or may be received in the form of a recording and may be received in various environments and locations. In addition, the system 100 discussed in FIG. 1 may be used as well as any of the devices discussed in FIGS. 2-3. Other examples of receiving spoken utterances may exist as well.

At block 404, the method 400 further comprises, based on the spoken utterances, identifying a language of the spoken utterances. A system may use one or more language identification (LID) systems to identify the language of the spoken utterances. In one instance, the device may send the received spoken utterances to one or more servers that may determine the language of spoken utterances and send a response back to the device. For example, a server may use a phoneme recognition system, wherein the server compares phonemes of the received spoken utterances to various inventories of phonemes stored in memory that may allow the server to identify the language of the spoken utterances based on the comparison. In addition, one or more speech recognition modules may be used to recognize the language of the spoken utterances as discussed herein. Other examples of language identification may exist as well.

In some examples, a system may be configured to recognize elements of speech through the use of one or more or more statistical approaches that may use statistic base comparisons to identify the language of the spoken utterances. In one example use of a statistical approach, a system may empirically construct family trees of languages based on elements that uniquely identify that language and use the family trees of languages to match up similar elements of received spoken utterances. The family trees of languages may be constructed through prior reception of utterances and/or may be accessed through a database and/or provided by another entity, such as a server. Every language may have specific character patterns and frequencies that a system may store and access to use for matching with received spoken utterances. Similarly, in another example, a system may use sampling to generate large random feature models, which may then be used to identify a language based on the occurrence of the features. A feature may be a component of a spoken utterance that may be recognized by a system to differentiate between utterances. In an additional example, the system may use syntactically derived close grammatical class models, matching the syntactic structure of received utterances rather than words or character sequences to determine the language of the spoken utterances. Other methods to identify a language of spoken utterances may be used as well.

Figure 5:
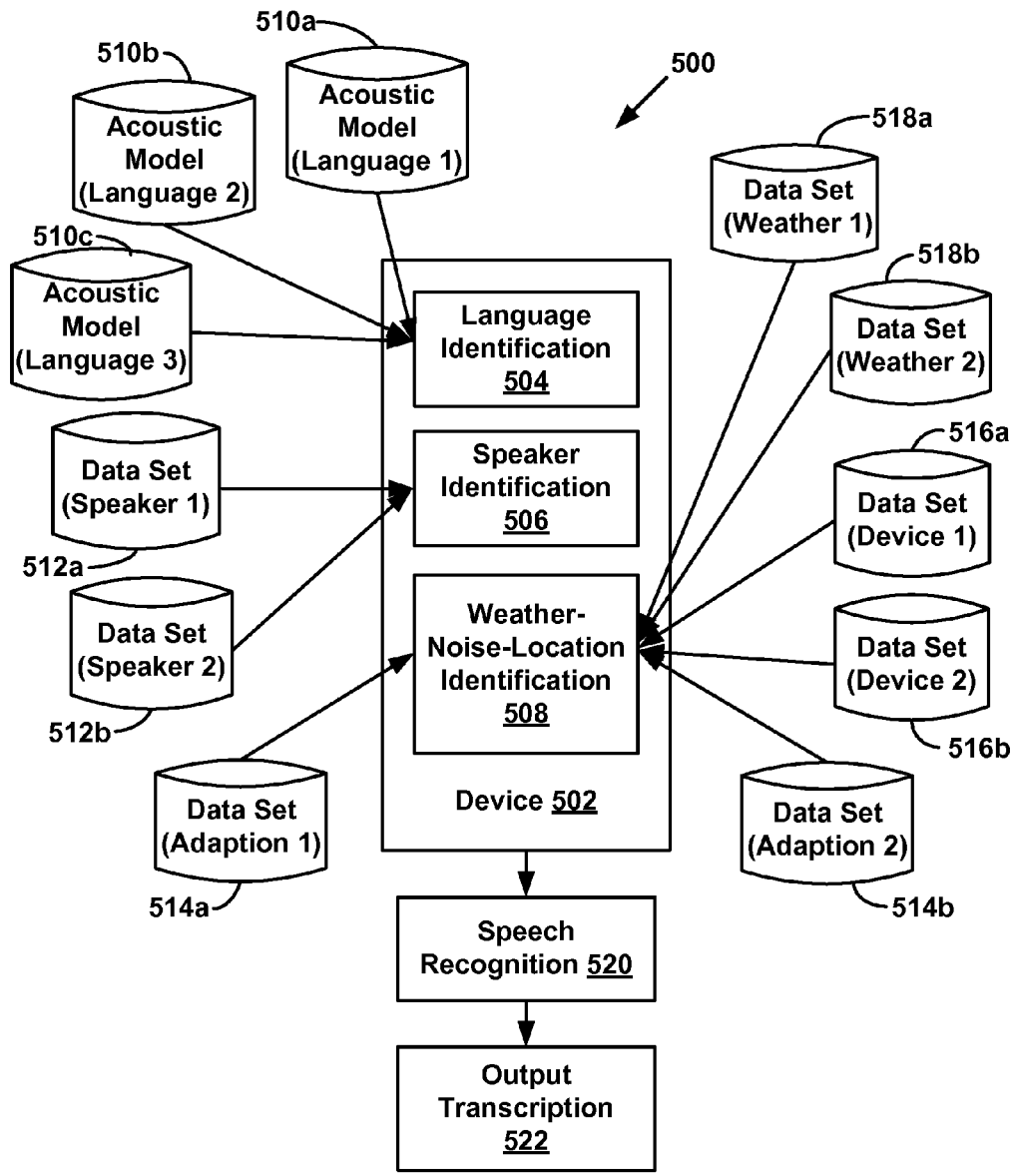
FIG. 5 illustrates an example block diagram for environmentally aware speech recognition.

At block 406, the method 400 comprises determining an acoustic model for a particular language based on the identified language. A device may be configured to determine an acoustic model for the particular language after determining the language of the spoken utterances. A system containing the device that received the spoken utterances may be configured to store multiple acoustic models that are each specific for a language. In other examples, the one or more acoustic models may be stored on the device or may be stored on a server. In addition, the acoustic models may be stored in various types of memory and accessed by one or more devices within a system. In some examples, one acoustic model may be configured to recognize one language and a different acoustic model may be configured to recognize a different language as shown in FIG. 5. Example languages may include English, Spanish, Korean, Chinese, and computer languages, etc. Additionally, an acoustic model may be configured to recognize and execute for more than one language. In one such illustration, an acoustic model may be configured to recognize both German and English.

In some examples, acoustic models may be stored with language identifiers for which the acoustic model represents, and the device can access the stored models to determine a model appropriate for the identified language. Similarly, some acoustic models may further be adapted to certain conditions, such as environment conditions and voice characteristics of particular speakers, and stored as an adapted version for those conditions. For example, a server may comprise multiple acoustic models for the English language, such as an acoustic model for English adapted to noisy conditions and an acoustic model for English for a device in quiet conditions. The server may select one of the English acoustic models based on the location of the device requesting the acoustic model and send that particular English acoustic model to the device receiving the spoken utterances in English.

At block 408, the method 400 includes determining a location of the device. One or more devices within the system that received the spoken utterances may be configured to determine the location of the device that received the spoken utterances. In one such instance, the device that received the spoken utterances may use a global positioning system (GPS) to determine the location of the device. In another example, the system may determine a device is using Wi-Fi and further infer that the device is indoors since the device is using the Wi-Fi signals. In addition, the system may take into account the bandwidth strength of the signals to determine whether a device is indoors or outdoors. Similarly, one or more entities within the system may be configured to use a combination of GPS and Wi-Fi signals along with other various means to determine the location of the device receiving the spoken utterances. Likewise, a device may be configured send the location to one or more servers within the system. In addition, determining the location of the device that received the spoken utterances allows the system to determine or estimate the location of the speaker of the spoken utterances.

Furthermore, the system determining the location of the device may also include the system determining or making inferences as to whether the device is in motion, such as traveling in a car. In some examples, determining the location of the device may enable the system to determine the rate at the device and speaker are moving. In one such example, a system containing the device receiving spoken utterances may determine the location of the device using GPS at various times and calculate using the changes in location and time intervals to find the rate that the device is moving. A system may use the rate the device is moving to determine that the device is on some mode of transportation, such as a train, car, subway, airplane, etc., and make changes to the acoustic model based on the determination. The system may also record the location of the device at various time intervals to determine the rate or speed that the device is moving. Further, the system may include an internal or external mapping system that allows the system to keep records of the location of the device and access information about locations, such as roads and train routes.

At block 410, the method 400 further includes determining environmental conditions regarding an environment of the location of the device. One or more entities within the system that received the spoken utterances may be configured to identify the environmental conditions of the device that received the spoken utterances. Based on the location of the device that received the spoken utterances, one or more entities in the system may determine possible environmental conditions based on the location. For example, a device may be configured to determine the temperature and other weather conditions based on the location. In one example, weather details may be estimated from databases using the location of the device. For example, the device or a server may be configured to access weather pages on the Internet to determine temperature and other weather conditions based on the location determined for the device. In addition, a device may be configured with an application to determine environmental conditions and use the conditions and/or send the information to a server for use.

Similarly, the device receiving spoken utterances may send the location of the device to a server within the system. The server may determine the weather details at the location received from the device and send to the device the appropriate data sets to adapt the acoustic model to the weather details. The system containing the device may access environmental condition information about different locations through a system, one or more databases, or an Internet connection, for example.

At block 412, the method 400 comprises determining from among a plurality of data sets at least one adaptation data set based on the environmental conditions. A system may be configured to select one or more data sets that relate to the environmental conditions that may impact the reception of the spoken utterances by the device in some manner. Some example types of data sets may include data sets for weather conditions and data sets for the device, which may be for specific location conditions. One or more devices within the system may be configured to access the various data sets from the plurality of data sets, which may be stored in a local memory or in a database. In addition, a device receiving spoken utterances may receive data sets from one or more entities, such as a server, to further adapt the acoustic model of the device. A server may store a plurality of data sets and acoustic models to send to one or more devices for use to recognize spoken utterances. In one example, the device receiving spoken utterances may be configured to receive one or more data sets from a server that may determine and send data sets to the device based on the location and environmental conditions of the device.

In some examples, the weather conditions may distort the recording of spoken utterances by a device. Thus, determining weather conditions based on the location of the device may allow the system to improve the efficiency of the speech recognition and adapt to the various conditions that may affect the reception of spoken utterances. Similarly, a system may determine that the device that received the spoken utterances is inside a building if the device is using Wi-Fi signals and adapt to conditions that may occur inside a building. In addition, the system may detect via GPS that the speaker and device are in motion and cross-reference with knowledge about roads, train routes, or other maps to determine if the speaker is in a car or train, etc.

At block 414, the method 400 includes using the at least one adaptation data set, adapt the acoustic model for the particular language to obtain another acoustic model that is adapted to the environmental conditions. The system may adapt the acoustic model for the particular language of the spoken utterances by obtaining another acoustic model that is adapted to the different environmental conditions that are present at the location of the device and speaker. Similarly, the system may adapt the acoustic model for the particular language to the environmental conditions. The system may use one or more techniques to adapt the acoustic model using the various data sets determined based on the speaker and environmental conditions with the device. Likewise, the system may use techniques and algorithms to adapt and/or select the acoustic model to be used, such as maximum likelihood linear regression (MLLR), vocal tract length normalization (VTLN), or maximum a posteriori (MAP) adaptation, which may utilize the information received from the various data sets to adapt and/or select the acoustic model for a particular language to the various conditions determined to impact the speech recognition of the device. For example, a speech recognizer within a system may use MLLR to adapt the acoustic model based on the last 5-10 utterances received by the device. The adaptation may be performed by taking an acoustic model as input and matching the acoustic model to some environmental, noise, and/or speaker characteristic. A system may be configured to obtain one or more additional acoustic models adapted to particular environmental conditions to adapt an acoustic model for a particular language. Similarly, a system may use VTLN with a single floating-point number, which may be used to normalize for pitch differences in the voice characteristics of various speakers.

In some examples of implementing method 400, the system using one or more adaptation algorithms or techniques may use a small amount of data from a target speaker to transform an acoustic model in order to adapt the model to the speaker and environmental conditions at that location. Adaptation may be used in training to make more specific recognition sets or may be used to reduce mismatches in recognition, for example. In an example, a system may use a MAP adaptation algorithm wherein the system may store one or more acoustic models trained on data for the target environmental conditions. The one or more acoustic models trained or obtained from memory may be interpolated with a source model that may be in use by the device prior to executing the recognition of spoken utterances. Similarly, in another example, a system may use a MLLR algorithm with a Gaussian mixture of acoustic models. The system may store a transform matrix that may be multiplied by the means of the Gaussian distributions being used. Furthermore, a system may keep some of the hidden layers fixed in a multi-layer neural network acoustic model when performing adaptation to adapt an acoustic model to better receive spoken utterances.

Additional examples exist for implementing environmentally aware speech recognition. In one instance, a device may receive spoken utterances from a speaker and send the spoken utterances to a server in order to receive an acoustic model for a particular language from the server based on the language of the spoken utterances. Similarly, a device may allow a speaker to select an acoustic model for a language through physical input with the device. For example, a speaker may change the speech recognition model in settings to receive "French" and in response to the speaker making the change in the settings, the device may either already have the acoustic model for "French" stored or may send a request to a server to receive the acoustic model for "French." The stored acoustic model that is in-use by the device may still be changed through the application of one or more data sets.

Likewise, a system containing one or more devices receiving spoken utterances may be configured to receive at least a threshold amount of spoken utterances at a device, such as a server. In response to receiving at least a threshold amount of spoken utterances, the server may be configured to analyze the spoken utterances and compare the various phonemes of the spoken utterances to stored libraries of vocabularies for particular languages. Based on the comparison, the server may be determine the language of the spoken utterances received and send an acoustic model to the device receiving the spoken utterances to use. Similarly, the device may process the spoken utterances at the device.

In another example implementation of method 400, the system may determine one or more voice characteristics of a speaker of the one or more utterances. The system may determine various voice characteristics, such as different vocal pitches, frequencies, variances in pronunciation, etc., that may vary between different speakers using a device. Using the voice characteristics, the system may determine at least one speaker data set based on the one or more voice characteristics from among the plurality of available data sets. A speaker data set may be used by the device to further adapt the acoustic model for the particular language to each individual speaker providing the specific spoken utterances. The speaker data set may configure the acoustic model to adapt to the various voice characteristics that capture the uniqueness of the speaker. For example, an acoustic model of a device may be adapted to execute differently depending whether a female speaker is speaking or whether a male speaker is speaking. Similarly, the system may select another acoustic model based on the one or more voice characteristics. In addition, the acoustic model may be further adapted to account for specific speakers within larger categories as well or may be selected based on the specification of the speakers. In one example, the device may be configured to determine the specific speakers providing spoken utterances to the device. The device may adjust settings and preferences based on the speaker determined to be speaking the spoken utterances. The acoustic model may be adapted via a transform specific to the speaker identified (using MLLR or MAP adaptation), for example.

In a further example implementation of method 400, a system may further determine one or more weather conditions depending on the location of the device. The system may use the location of the device to determine weather conditions such as, the temperature, whether it is sunny, windy, or raining, etc. One or more entities within the system may access the Internet or another source that may determine the weather conditions based on the location of the device. A speech recognition system may work differently depending on weather conditions. Thus, based on the weather conditions, the system may determine weather data sets from the plurality of data sets that may use to further adapt the acoustic model for the particular language to adjust to the weather conditions. For example, a system may be configured to use a weather data set for a severely windy environment to adapt an acoustic model to better detect spoken utterances from a speaker that is walking outside during a windy day. A system may also be configured to select another acoustic model based on the one or more weather conditions related to the location of the device.

In another example, a system may be configured to determine the air temperature and humidity in addition to wind speeds to determine data sets that may be applied to the acoustic model to adapt to the conditions. The system may also use the data sets to determine additional acoustic models for adapting the system. The air temperature and humidity may impact the speed of sound and cause changes in the resonance characteristics observed by the device. Similarly, a system may be configured to use the location of the device receiving the spoken utterances to make the speech recognition module sensitive to the location. In some examples, the system may modify the libraries of vocabulary and language models of the device to further adapt the system for recognizing location specific words. The device may be adapted to provide directions quicker if the device takes into account the location of the device to find nearby destinations.

In some instances, the system may be configured to determine a rate of movement associated with the device capturing the spoken utterances and based on the rate of movement, adapt the acoustic model for the particular language accordingly. For example, the system may use GPS to determine that the device is moving at sixty miles per hour (mph) and determine that the speaker with the device is on some form of transportation since the device is moving at such a fast rate. The system may adapt and/or obtain the acoustic model based on the movement assuming the person is in a vehicle or a train to account for any noise that usually results from a vehicle or train. The system may use data sets that adapt an acoustic model according to the conditions of a train or a vehicle. In addition, the system may also reference a system of maps that include train routes, and streets to determine whether the device is on a train or in a car. Public transportation such as subways and trains may make more noise than cars and the system may be configured to adapt the acoustic model of the device depending on the type of transportation. Further, the system may select another acoustic model based on the particular type of transportation. Similarly, the system may determine that the device is moving at a great rate, such as 500 mph, and determine that the device is on an airplane and make the necessary adaptation to the acoustic model using an adaptation data set for an airplane. The system may also be configured to determine additional other acoustic models that may be used to further adapt an acoustic model for the particular language to the environmental conditions related to the rate of movement of the device.

In another example, a system containing a device receiving spoken utterances may determine that the device is located outside any building. In response, the system may cause the device to use an acoustic model that functions for the particular language of the spoken utterances, but also functions in an outside environment to account for the conditions that may affect the speech recognition, such as any street noise. The device may receive a different acoustic model that may be better suited for indoor use if the system determines the device is indoors. Other acoustic models may be used for certain environments of the device as well. In addition, the acoustic models may be capable of being adapted to the conditions to a greater degree by the application of one or more data sets based on the location and environmental conditions of the device. The system may obtain another acoustic model to further adapt an acoustic model for a particular language based on determining that the device is located outside and/or inside a building.

In some examples, a server within a system may be configured to adapt devices in similar locations since the devices may be in similar environmental conditions. For example, a server may adapt all devices within in a certain range for a specific temperature based on the temperature in that area. In another example, a device may be configured to request to be adapted to a windy day by a server. The server may adapt that device along with other devices in the same area to function according to the windy conditions. Similarly, the system may obtain additional acoustic models for adaptation based on having similar locations of other devices.

Furthermore, a speaker may be able to confirm or cancel any adaptations to the acoustic model or other changes made to the device receiving the spoken utterances. The device and/or server may be configured to use responses of the speaker to further determine whether actions by the device or server were correct or unwanted. For example, a device may receive spoken utterances and send the utterances to a server in order to receive an acoustic model for the particular language of the spoken utterances. After receiving an acoustic model, the speaker may input further actions that confirm the acoustic model received by the device from the server was for the correct languages of the utterances. Likewise, the speaker may recognize that the acoustic model is providing incorrect transcriptions and input a response into the device canceling the transcriptions. The device may determine that the acoustic model received was incorrect and send another request for a new acoustic model. Further, the server and/or device may store a record of the correct or incorrect executions for future use.

FIG. 5 shows a diagram for an example implementation for environmentally aware speech recognition. The example implementation 500 may be shown in other forms and may include more or less components. The example shown in FIG. 5 serves merely as an example overview of a possible implementation for environmentally aware speech recognition. Other implementations and examples may exist as well.

The example in FIG. 5 shows a system 500 comprising a device 502, which further comprises components, such as a language identification 504 component, a speaker identification 506 component, and a weather-noise-location identification 508 component. In some examples, the device 502 may further comprise more or less components and the components may be combined and/or separated. In addition, the system 500 may include additional entities, such as other devices or servers, which may communicate with the device 502. Further, the device 502 and/or other entities within the system 500 may be configured to perform algorithms and/or execute tasks as described herein.

The example illustrated by FIG. 5 also comprises the data sets 510a-518b that may be used to improve the speech recognition 520 of the device 502. The data sets 510a-510c represent acoustic models that a speech recognition module may use to determine transcriptions for received spoken utterances. In addition, the data sets 512a-518b represent different information that may be used to adapt the acoustic model or obtain additional acoustic models based on the speech recognition to specific conditions, such as wind, variances in voices, and temperature, for example. The data sets 510a-518b may be used by one or more devices and may be combined through the use of algorithmic techniques, such as MLLR and VTLN, for example. The data sets 510a-518b may be stored in the system in a server and/or another entity and may be related to one or more components within the device 502.

In addition, the data sets 510a-518b may be sent to the device 502 upon receiving a request from the device 502 to adapt the speech recognition module 520 of the device 502 to incoming spoken utterances. Similarly, the device 502 may be configured to use the adapted speech recognition system to output transcription 522. In some examples, the device 502 may use additional means to adapt the acoustic model to the conditions, such as allowing the speaker to adjust settings based on local conditions. Further, the device 502 may obtain one or more acoustic models based on the local conditions. Other examples may exist as well.

In addition, each data set 510-518b may comprise information that may be used to adapt an acoustic model to conditions of the location of the device 502 or conditions based on the speaker as discussed in FIG. 4. An entity, such as a server, within the system 500 may receive a request from the device 502 to update the speech recognition 520 based on the speaker or location and may determine that one or more data sets that may be used to adapt the acoustic model used in speech recognition 520 of the device 502. The server may receive a location from the device 502 and access one or more databases to determine the environmental conditions based on the location. Similarly, the server may determine voice characteristics based on the received spoken utterances sent by the device to the server. Upon determining the conditions and/or speaker related to the device 502, the server may determine data sets and combine them with an acoustic model for a particular language of the spoken utterances to send to the device 502. In other examples, the server may send data sets to the device 502 and the device 502 may adapt the acoustic model to the data sets at the device 502 rather than at the server. The device 502 may also adapt the acoustic model to the data sets by obtaining one or more additional acoustic models adapted to the particular conditions.

In the example implementation for environmentally aware speech recognition shown in FIG. 5, the language identification 504 relates to acoustic models 510a-510c. Each acoustic model 510a-510c may recognize a particular language. For example, an acoustic model 510a may recognize language 1 and an acoustic model 510*b* may recognize language 2. Depending on the one or more spoken utterances received by a device, the language identification 504 may be configured to determine which acoustic model may recognize the spoken utterances. In other examples, a device or another entity within the system 500 may be configured to determine one or more acoustic models 510*a*-510*c* to use by a device receiving spoken utterances. The acoustic model chosen should be configured to recognize the language of the received spoken utterances. In some examples, the acoustic models 510*a*-510*c* may include further parameters that may allow a speech recognition model to further adapt to receiving spoken utterances in a certain environment or to select another acoustic model based on the environment. For example, acoustic model 510*b* may recognize a language 2 and may also be further adapted to windy, warm-temperature environments. Other examples of acoustic models for a device may exist as well.

In addition, the device 502 may comprise a component for speaker identification 506, which may be used to further adapt an acoustic model to differences in speakers providing spoken utterances. After selecting an acoustic model for the particular language of the spoken utterances, the system 500 may further adapt the acoustic model to the speaker of the spoken utterances. The system 500 may select one or more speaker data sets from among a plurality of data sets that relate to one or more voice characteristics of the speaker. Some example voice characteristics may include accent identification, vocal pitch, and frequency, etc. In the example shown by FIG. 5, the speaker identification 506 within the device 502 relates to speaker data sets 512*a*-512*b*.

Further, device 502 may comprise a component for weather-noise-location identification 508. The weather, noise, and location identification 508 component may be configured to adapt the acoustic model selected for the particular language of the speaker. Various environments may impact the execution of speech recognition associated with a device. Factors such as background noise, temperature, weather conditions, etc. may about impact the ability for a speech recognition module to properly receive and process spoken utterances. Thus, device 502 may further comprise determining and using data sets related to the weather-noise-location identification 508 to further adapt the acoustic model or to obtain another acoustic model. The example shown in FIG. 5 shows data sets 514*a*-518*b* may relate to the weather-noise-location identification 508. Data sets 514*a*-514*b* are adaptation data sets that may be used to further adapt the acoustic model to one or more environmental conditions. In some examples, the system may adapt the acoustic model of a device to a windy, cold day by determining the weather at the location of the device through using the Internet and adapting the acoustic model with proper data sets for those environmental conditions. Further, the system may be configured to obtain other acoustic models that are adapted to particular environmental conditions to adapt an acoustic model for a particular language.

Similarly, data sets 516*a*-516*b* are device data sets that may be used within the device 502 to adapt the acoustic model depending on the type of wireless connection in use by the device receiving the spoken utterances. The device data sets 516*a*-516*b* may further adapt an acoustic model or select additional acoustic models based on whether the device 502 is determined to be indoors or outdoors, for example. In another example, the device data sets 516*a*-516*b* may be used depending on whether the device is located in a quiet setting with minimum received noise or in a louder setting with lots of background noise being detected by the device 502. Likewise, data sets 518*a*-518*b* may be weather data sets and relate to one or more weather conditions. Based on the location of the device receiving the spoken utterances, the device 502 may use one or more weather data sets to adapt the acoustic model to account for the weather conditions in that location. A system may apply a combination of the data sets to one or more acoustic models to further adapt the acoustic model to the conditions of the location of the device or to obtain another acoustic model that is adapted to the conditions of the location. The data sets may be combined in real-time and/or may be applied through various means. A system may use one or more databases or an Internet connection to determine the weather conditions at the location of the device. Based on determining the weather conditions, an entity within the system may select the weather data sets 518*a*-518*b* from the plurality of data sets that best match the weather conditions at the location of the device and may use the data sets to adapt the acoustic model of the device to the weather or to obtain another acoustic model adapted to the weather conditions.

Upon receiving one or more data sets and/or acoustic models, the device 502 may be configured to use one or more adaptation algorithms, such as MLLR, VTLN, and MAP Adaptation, etc., to adapt the acoustic model with the data sets or to obtain another acoustic model that may function according to the data sets. The adaptation may permit the speech recognition 520 to account for the new conditions that may impact speech recognition. In some examples, the device 502 may use one or more of the different adaption techniques for multiple speech recognition modules and may send outputs to one or more devices. Additionally, a server within the system may store previously adapted acoustic models for particular languages and send the acoustic models to devices that request acoustic models based on the location and/or received spoken utterances of the device. Similarly, the speech recognition 520 may be used by one or more devices and may produce various outputs, including output transcription 522, for example. The adaptation may be performed by the system continuously in real-time, or the system may adapt the acoustic model in a series of steps. The steps may be arranged in various combinations and may be repeated multiple times. The output transcription 522 may be used be one or more devices.

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and examples have been disclosed herein, other aspects and examples will be apparent to those skilled in the art. The various aspects and examples disclosed herein are for purposes of illustration and are not intended to be limiting, with the true scope being indicated by the following claims, along with the full scope of equivalents tow hic such claims are entitled. It is also to be understood that the terminology used herein is for the purpose of describing particular examples only, and is not intended to be limiting.

The invention claimed is:
1. A method, comprising:
  receiving, via a device, one or more spoken utterances;
  based on the one or more spoken utterances, identifying a
    language of the one or more spoken utterances;

determining an acoustic model for a particular language based on the identified language, wherein the acoustic model for the particular language is configured for use in speech recognition;
determining a location of the device;
determining one or more environmental conditions regarding an environment of the location of the device;
determining from among a plurality of data sets at least one adaptation data set based on the one or more environmental conditions and the location of the device, wherein the at least one adaptation data set includes information that enables recognition of speech preferences associated with the location; and
using the at least one adaptation data set, adapting the acoustic model for the particular language to obtain another acoustic model that is adapted to the one or more environmental conditions and the location of the device.

2. The method of claim 1, further comprising:
based on the one or more spoken utterances, determining one or more voice characteristics of a speaker of the one or more spoken utterances;
determining from among the plurality of data sets at least one speaker data set based on the one or more voice characteristics of the speaker; and
using the at least one speaker data set to further adapt the acoustic model for the particular language to the speaker.

3. The method of claim 1, further comprising:
determining a type of wireless connection in use by the device;
based on the type of wireless connection, determining from among the plurality of data sets at least one device data set; and
using the at least one device data set to further adapt the acoustic model for the particular language.

4. The method of claim 1, wherein the one or more environmental conditions include one or more weather conditions based on the location of the device, and the method further comprises:
determining the one or more weather conditions of the location of the device;
based on the one or more weather conditions, determining from among the plurality of data sets at least one weather data set; and
using the at least one weather data set to further adapt the acoustic model for the particular language.

5. The method of claim 1, wherein using the at least one adaptation data set to adapt the acoustic model for the particular language comprises:
using one or more of the following techniques: maximum likelihood linear regression (MLLR), vocal tract length normalization (VTLN), or maximum a posteriori (MAP) adaptation.

6. The method of claim 1, further comprising:
determining a rate of movement of the device; and
adapting the acoustic model for the particular language based on the rate of movement of the device.

7. The method of claim 1, wherein determining the acoustic model for the particular language based on the identified language comprises:
sending the one or more spoken utterances to a server; and
receiving from the server the acoustic model.

8. A non-transitory computer readable medium having stored therein instructions, that when executed by a computing system, cause the computing system to perform functions comprising:
receiving, via a device, one or more spoken utterances;
based on the one or more spoken utterances, identifying a language of the one or more spoken utterances;
determining an acoustic model for a particular language based on the identified language, wherein the acoustic model for the particular language is configured for use in speech recognition;
determining a location of the device;
determining one or more environmental conditions regarding an environment of the location of the device;
determining from among a plurality of data sets at least one adaptation data set based on the one or more environmental conditions and the location of the device, wherein the at least one adaptation data set includes information that enables recognition of speech preferences associated with the location; and
using the at least one adaptation data set, adapting the acoustic model for the particular language to obtain another acoustic model that is adapted to the one or more environmental conditions and the location of the device.

9. The non-transitory computer readable medium of claim 8, wherein the functions further comprise:
based on the one or more spoken utterances, determining one or more voice characteristics of a speaker of the one or more spoken utterances;
determining from among the plurality of data sets at least one speaker data set based on the one or more voice characteristics of the speaker; and
using the at least one speaker data set to further adapt the acoustic model for the particular language to the speaker.

10. The non-transitory computer readable medium of claim 8, wherein the functions further comprise:
determining a type of wireless connection in use by the device;
based on the type of wireless connection, determining from among the plurality of data sets at least one device data set; and
using the at least one device data set to further adapt the acoustic model for the particular language.

11. The non-transitory computer readable medium of claim 8, wherein the one or more environmental conditions include one or more weather conditions based on the location of the device, and the functions further comprises:
determining the one or more weather conditions of the location of the device;
based on the one or more weather conditions, determining from among the plurality of data sets at least one weather data set; and
using the at least one weather data set to further adapt the acoustic model for the particular language.

12. The non-transitory computer readable medium of claim 8, wherein the function of using the at least one adaptation data set, adapting the acoustic model for the particular language to obtain another acoustic model that is adapted to the one or more environmental conditions comprises:
using one or more of the following techniques: maximum likelihood linear regression (MLLR), vocal tract length normalization (VTLN), or maximum a posteriori (MAP) adaptation.

13. The non-transitory computer readable medium of claim 8, wherein the functions further comprise:
determining a rate of movement of the device;
adapting the acoustic model for the particular language based on the rate of movement of the device.

14. The non-transitory computer readable medium of claim 8, wherein the function for determining the acoustic model for the particular language based on the identified language comprises:
sending the one or more spoken utterances to a server; and
receiving from the server the acoustic model.

15. A system, comprising:
at least one processor; and
data storage comprising program instructions executable by the at least one processor to cause the system to perform functions comprising:
receiving, via a device, one or more spoken utterances;
based on the one or more spoken utterances, identifying a language of the one or more spoken utterances;
determining an acoustic model for a particular language based on the identified language, wherein the acoustic model for the particular language is configured for use in speech recognition;
determining a location of the device;
determining one or more environmental conditions regarding an environment of the location of the device;
determining from among a plurality of data sets at least one adaptation data set based on the one or more environmental conditions and the location of the device, wherein the at least one adaptation data set includes information that enables recognition of speech preferences associated with the location; and
using the at least one adaptation data set, adapting the acoustic model for the particular language to obtain another acoustic model that is adapted to the one or more environmental conditions and the location of the device.

16. The system of claim 15, wherein the functions further comprise:
based on the one or more spoken utterances, determining one or more voice characteristics of a speaker of the one or more spoken utterances;
determining from among the plurality of data sets at least one speaker data set based on the one or more voice characteristics of the speaker; and
using the at least one speaker data set to further adapt the acoustic model for the particular language to the speaker.

17. The system of claim 15, wherein the functions further comprise:
determining a type of wireless connection in use by the device;
based on the type of wireless connection, determining from among the plurality of data sets at least one device data set; and
using the at least one device data set to further adapt the acoustic model for the particular language.

18. The system of claim 15, wherein the one or more environmental conditions include one or more weather conditions based on the location of the device, and the functions further comprises:
determining the one or more weather conditions of the location of the device;
based on the one or more weather conditions, determining from among the plurality of data sets at least one weather data set; and
using the at least one weather data set to further adapt the acoustic model for the particular language.

19. The system of claim 15, wherein the functions further comprise:
determining a rate of movement of the device;
adapting the acoustic model for the particular language based on the rate of movement of the device.

20. The system of claim 15, wherein the function for determining the acoustic model for the particular language based on the identified language comprises:
sending the one or more spoken utterances to a server; and
receiving from the server the acoustic model.

* * * * *